Figure 3:
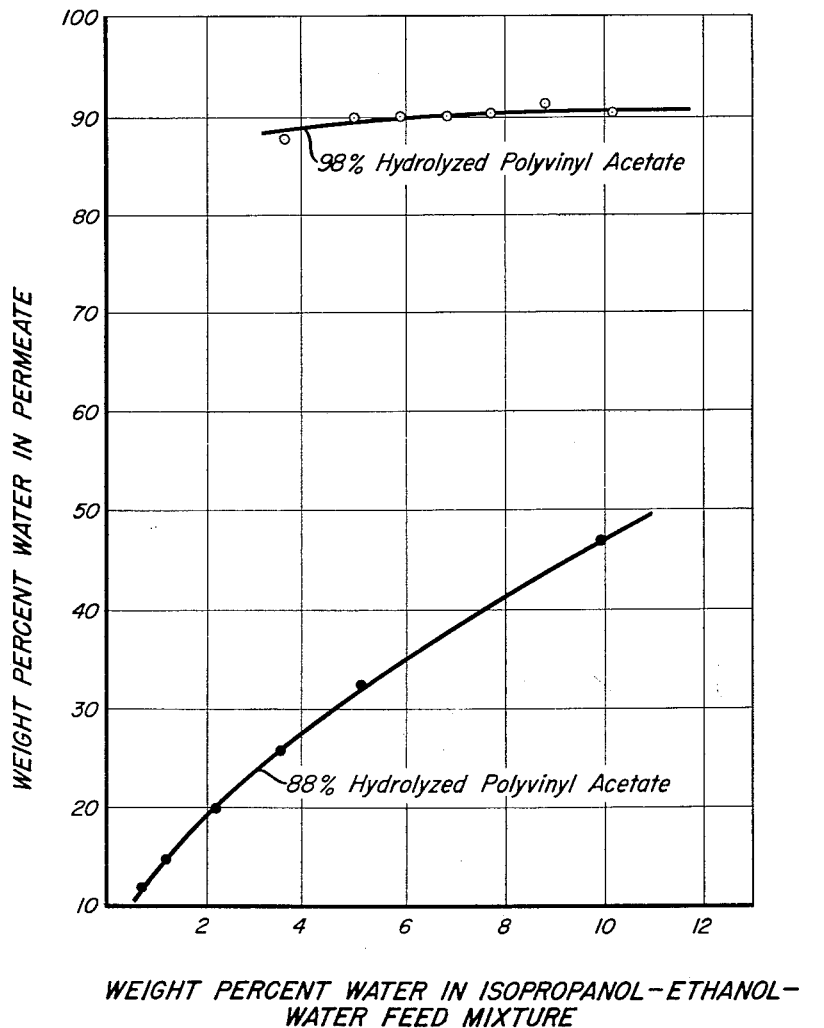

May 15, 1962 R. C. BINNING ET AL 3,035,060
PROCESS FOR REMOVING WATER FROM ORGANIC CHEMICALS
Filed June 18, 1957
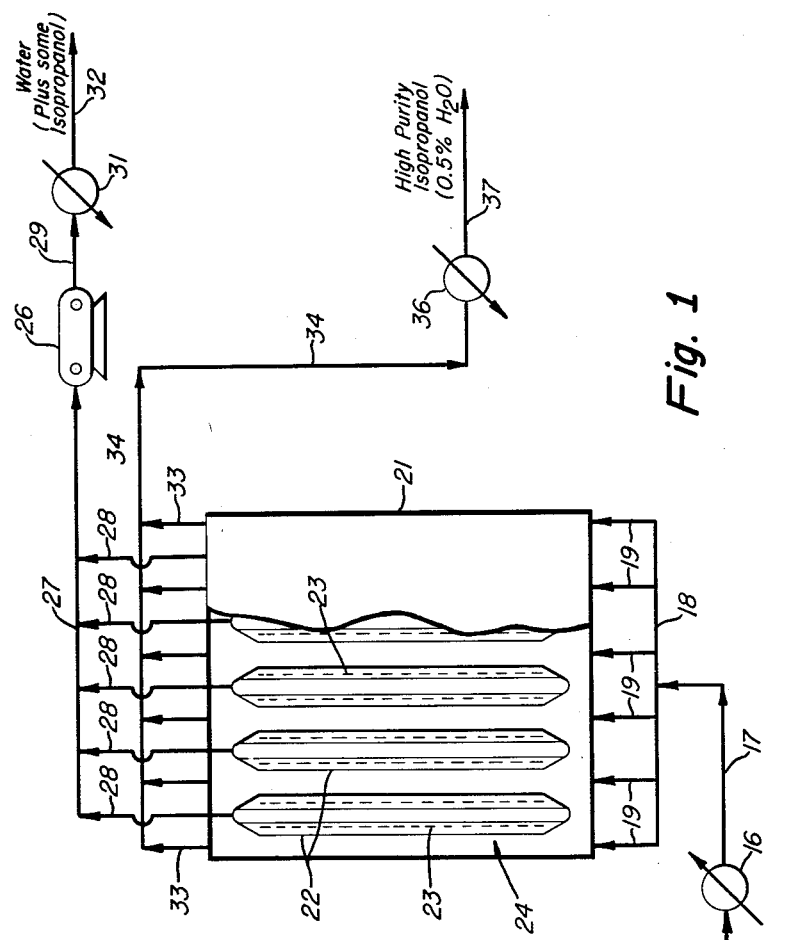
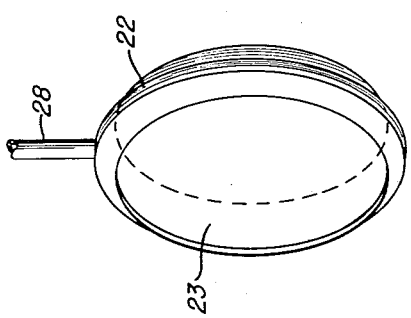
INVENTORS:
Robert C. Binning
Joseph F. Jennings
Eugene C. Martin
BY *Joseph C. Kotarski*
ATTORNEY

WEIGHT PERCENT WATER IN ISOPROPANOL-ETHANOL-
WATER FEED MIXTURE

3,035,060
PROCESS FOR REMOVING WATER FROM ORGANIC CHEMICALS
Robert C. Binning, Joseph F. Jennings, and Eugene C. Martin, Texas City, Tex., assignors, by mesne assignments, to Standard Oil Company, Chicago, Ill., a corporation of Indiana
Filed June 18, 1957, Ser. No. 666,442
14 Claims. (Cl. 260—290)

This invention relates to an improved process for removing water from a water-organic chemical mixture, and it particularly concerns improvements in the use of a permeation process for removing the water.

An object of this invention is to provide an improved process for removing water from a water-organic chemical mixture. Another object is to provide an improved permeation process for the removal of water from water-organic chemical mixtures in which a highly selective separation between the water and organic chemical is effected. Another object is to provide an improved permeation membrane which is highly stable toward water and which displays a high selectivity over prolonged periods of operation in separating water from organic chemicals. An additional object is to provide an improved permeation process which reduces the concentration of water in a water-organic chemical mixture and has the advantages of minimizing the amount of water-organic chemical mixture which is lost or is recycled, and also minimizes the size of permeation equipment needed, the surface area of permeation membrane required, and the investment capital ordinarily necessary.

It has been discovered that these and other objects and advantages can be obtained by employing as the permeation membrane a hydrolyzed polyvinyl acetate membrane which has at least 98 percent of its acetyl groups removed by hydrolysis. The stability toward water which is displayed by the hydrolyzed polyvinyl acetate membrane can be improved by curing the hydrolyzed polyvinyl acetate membrane at a temperature of at least about 100° C., e.g. 100–150° C. or higher. The curing is most advantageously carried out in the substantial absence of oxygen. The invention provides a method for removing water from a wide variety of organic chemicals such as alcohols, e.g. ethanol, isopropanol, sec-butanol, etc. dioxane, pyridine, acrylonitrile, etc. which are admixed with water.

The hydrolyzed polyvinyl acetate employed in this invention is one which has at least 98 percent of its acetyl groups removed by hydrolysis. To our surprise it has been found that hydrolyzed polyvinyl acetate, which has been hydrolyzed to remove at least 98 percent of its acetyl groups, is an extremely selective membrane for removing water from water-organic chemical mixtures. Peculiarly, hydrolyzed polyvinyl acetate which has been hydrolyzed to a lesser extent is much inferior from a standpoint of selectivity for removing water in preference to the organic chemical. For example, we have shown that when an aqueous solution of ethanol and isopropanol (containing about 5 percent by weight of water) is employed as the charge to a permeation process, the permeated fraction will consist of 90 percent water and 10 percent alcohols when a hydrolyzed polyvinyl acetate permeation membrane having 98 percent of its acetyl groups removed by hydrolysis is employed; whereas when a hydrolyzed polyvinyl acetate having 88 percent of its acetyl groups removed by hydrolysis is used, the permeated fraction contains only 32 percent water and 68 percent alcohols. The membrane may contain other materials, e.g. carboxymethylcellulose, casein, etc. in addition to the hydrolyzed polyvinyl acetate. Membranes comprised of the hydrolyzed polyvinyl acetate and casein may be employed with advantage since they have approximately the same selectivity as the hydrolyzed polyvinyl acetate, but have much higher permeation rates than does the hydrolyzed polyvinyl acetate which contains no casein. The hydrolyzed polyvinyl acetate-casein membranes are especially useful for the separation of water from neutral (i.e. non-acid and non-alkaline) aqueous chemical solutions.

The defined hydrolyzed polyvinyl acetates employed in this invention have a superior selectivity for removing water, by comparison with other membranes. In addition they may be used for a very long period of time without suffering a loss in selectivity, such as occurs with other permeation membranes. This is of great importance because if the membrane loses selectivity to a substantial extent, the operation of the permeation unit must be shut down and the old membranes replaced with new permeation membranes. To illustrate the unexpectedly high selectivity and unusually good maintenance of selectivity, a regenerated cellulose membrane and a hydrolyzed polyvinyl acetate membrane (in which 99 percent of the acetyl groups had been hydrolyzed) were compared. The regenerated cellulose membrane is one of the best membranes discovered so far for the selective permeation of water. When a mixture of isopropanol and water (containing about 11–12 percent water) was employed as the feed mixture to be dehydrated, the initial permeate when using the regenerated cellulose membrane contained 85 percent water, and after 500 hours of operation the water content of the permeate dropped down to 53 percent water. The initial permeate obtained when employing the defined hydrolyzed polyvinyl acetate membrane contained approximately 93 percent water, and after 2,600 hours of continuous operation of the permeation unit, the permeate contained 91.5 percent water. Another unusual feature of the 98–99 percent hydrolyzed polyvinyl acetate membranes is that the permeate contains a high and rather constant concentration of water even when the water content of the feed mixture diminishes. This is in contrast with the results obtained with less highly hydrolyzed polyvinyl acetate membranes, such as 88 percent hydrolyzed polyvinyl acetate membranes, wherein the percentage of water in the permeate decreases when the percentage of water in the feed mixture decreases. The great value and advantages to be obtained with the defined membranes employed in this process are apparent from the above results.

It has also been found to be advantageous to cure the hydrolyzed polyvinyl acetate membrane by heating it. This enables use of the membrane for the high temperature separation of water-organic chemical mixtures which are comprised primarily of water. If the membrane has not been cured, i.e. heat treated, it must be employed at lower temperatures or with lower concentrations of water in the feed mixture in order to prevent rupturing of the membrane during the permeation process. As an example, at a given permeation temperature of 150° C. the hydrolyzed polyvinyl acetate membrane which has not been cured will rupture when the liquid feed mixture of water-isopropanol contains 50 percent water; whereas when a hydrolyzed polyvinyl acetate membrane which has been cured by heat treating at about 150° C. for several days is employed for permeation of a liquid water-isopropanol feed mixture at 150° C., the membrane did not rupture even though the feed mixture contained 85 percent water. The curing of the hydrolyzed polyvinyl acetate membrane must be carried out after the membrane has been formed, i.e. curing is not carried out by subjecting a solution of the hydrolyzed polyvinyl acetate to the curing temperatures before casting the membrane from the solution. The curing can be carried out at temperatures of 100° to 150° C. or higher for one hour to several days or longer and preferably in the substantial absence of oxygen. For example, it can be carried out in the presence of nitrogen or a liquid which does not react with the membrane. If curing is carried out in the presence of oxygen, the membrane tends to oxidize, changes color, and otherwise becomes degraded.

The invention will be more clearly understood from the attached figures which form a portion of this specification. FIGURE 1 illustrates an embodiment of the invention in schematic form for removing water from an isopropanol-water mixture containing 12–13 weight percent water and thereby producing substantially water-free isopropanol. FIGURE 2 is a perspective view of one of the permeation cells. FIGURE 3 graphically compares the selectivity of 98 percent hydrolyzed and 88 percent hydrolyzed polyvinyl acetates for removing water from a water-alcohol feed mixture.

In the embodiment illustrated in FIGURE 1, an isopropanol water solution containing 12–13 weight percent water is charged from source 11 by way of line 12 into pump 13 wherein it is pressured to about 100 p.s.i.g. The pressured mixture is then passed by way of line 14 into heater 16 wherein the temperature of the isopropanol-water solution is raised to about 150° C. The heated solution is passed by way of line 17 into manifolding line 18, through header lines 19 into permeation vessel 21.

A cut-away view of permeation vessel 21, with a portion of the sidewall cut away, is shown herein. The permeation vessel 21 is of cylindrical shape, the axis of the cylinder being horizontal. Within the permeation vessel are suspended the permeation cells 22. These cells are of circular shape and similar to filter leaves. Two circular-shaped hydrolyzed polyvinyl acetate membranes 23 (having 99 percent of the acetyl groups removed by hydrolysis) which are about 1 mil in thickness are attached to the permeation cell and form the opposite faces thereof. A screen-like or sintered metal framework, not shown herein, is contained within the permeation cells to support the permeation membranes 23.

The entire interior of permeation vessel 21 is filled with the liquid isopropanol water feed mixture. Thus the interior zone 24 functions as the feed chamber. The interior of the permeation cells 22 functions as the permeate zones. The feed isopropanol-water solution introduced by way of header lines 19 into the bottom of permeation vessel 21 slowly passes upwardly in the spaces between the permeation cells. A subatmospheric pressure is maintained within the interior of permeation cells 22 by means of a vacuum-compressor pump 26 attached to line 27 which is attached to permeate header lines 28 at the top of each of the permeation cells 22. However it is possible to vaporize some permeating materials at atmospheric pressure on the permeate side if the temperature is sufficiently above the vaporization temperature. In this latter case no vacuum-compressor is necessary. A liquid mixture permeates into and through the permeation membranes, and is vaporized into the permeate zones and is withdrawn through permeate header lines 28 into line 27, and then passed into vacuum-compressor pump 26. Compressed gases are removed by way of line 29 and passed into cooler 31. A liquid is withdrawn from cooler 31 by way of line 32. This liquid consists of about 92 percent water, the remainder being isopropanol. This stream may be fractionated to separate an essentially pure water fraction (which is discarded) from an isopropanol-water fraction containing about 12 percent water, which latter fraction can be recycled to the permeation process.

As the feed mixture (which is introduced into permeation vessel 21 by way of header lines 19) passes upwardly through the permeation vessel in the spaces between the individual permeation cells, its water content diminishes. Care must be taken to avoid undue turbulence and mixing of the initially introduced feed mixture with the mixture which has passed across the face of the permeation membranes and has become depleted in water. The total surface area of the hydrolyzed polyvinyl acetate membranes employed in all of the permeation cells is sufficient to reduce the water content of the isopropanol-water mixture down to 0.5 percent water at the particular rate of charging the feed mixture. When the mixture in feed chamber 24 reaches the top of the permeation vessel 21, it contains about 0.5 percent water. When the non-permeated fraction reaches the top of the permeation vessel 21 it is withdrawn through header lines 33 which communicate with manifolding line 34. The non-permeated fraction in line 34 is passed to cooler 36 wherein the temperature of the non-permeated portion is reduced to atmospheric or storage temperatures. The cooled liquid is withdrawn from cooler 36 and passed by way of line 37 to storage means not shown. This product liquid is high purity isopropanol containing 0.5 weight percent or less of water.

FIGURE 2 shows a perspective view of one of the permeation cells 22. The permeation cell is shaped like a thin tire and has the permeation membrane attached across the two open faces of the tire-shaped cell. The permeation membrane is sealed across these open faces in a leak-proof manner. Permeate header line 28 is attached to the top of permeation cell 22 and communicates with the interior thereof.

While the embodiment related above describes the removal of water from isopropanol, the present invention can be employed for removing water from other organic chemical compounds which contain one or more atoms of oxygen, sulfur, halogens, nitrogen, or phosphorous. Organic chemical compounds such as alcohols, ethers, aldehydes, ketones, acetals, esters, carboxylic acids; mercaptans, thioethers, dithioethers, thioesters, thiocarboxylic acids; mono-, di-, and polyhalogen compounds; amines, amides, heterocyclic nitrogen, oxygen, and sulfur compounds, etc. may be processed for the removal of water therefrom. The organic chemical may be water soluble or oil soluble. The invention is used most efficiently for the separation of water from water soluble organic chemicals in which the water cannot be easily separated from the chemical by techniques such as fractionation, etc.

A number of experiments were carried out which demonstrate the effectiveness of the hydrolyzed polyvinyl acetate membrane (at least 98 percent of the acetyl groups being removed by hydrolysis) for the separation of water from diverse water-organic chemical mixtures. A small scale permeation apparatus was employed. It consisted of a feed chamber for the feed mixture; a membrane holder of box-like shape having 5 open faces across which the membrane was sealed, the sixth face having sealed thereto a line for removing the peremated fraction from the interior (permeate zone) of the membrane holder; and associated pumps, pressure regulating and measuring devices, and temperature controllers for controlling the temperature and pressure in the feed and permeate zones at those conditions desired. The apparatus provided a total membrane surface of 22 square inches.

*Example 1*

A feed mixture consisting of 12.8 percent water, 8.1 percent ethanol, and 79.1 percent isopropanol by weight was charged to the feed zone of the above-described permeation apparatus. The permeation membrane employed was a hydrolyzed polyvinyl acetate membrane which had 98 percent of its acetyl groups removed by hydrolysis. The membrane was 0.75 mil in thickness. The mixture in the feed zone was held at a permeation operating temperature of about 150° C. and was maintained in the liquid state by maintaining a superatmospheric pressure within the feed chamber. The permeate zone was maintained at a subatmospheric pressure of about 200 mm. Hg abs. After the permeation run had begun, a sample of the permeated fraction was continuously collected. After a sufficient quantity of the permeated fraction had been collected, a portion of the mixture remaining in the feed zone was removed. Analyses of the permeated fraction and the fraction remaining in the feed zone were then made. This sequence of permeate fraction collection followed by analyses of the collected permeate fraction and the fraction remaining in the feed zone was repeated until the water content of the mixture in the feed zone had decreased from the original 12.8 percent to about 3.5 weight percent. The weight percent water in the successive permeated fractions was then plotted on the vertical axis against the weight percent water in the isopropanol-ethanol-water feed mixture remaining in the feed zone. The results obtained are plotted in this manner in attached FIGURE 3. It is evident that this 98 percent hydrolyzed polyvinyl acetate enables production of a permeate fraction containing approximately 90 weight percent water even when the water content of the feed mixture in contact with the permeation membrane diminishes from 12.8 percent down to 3.5 weight percent.

Run No. 2

Another run was carried out in exactly the same manner as described in Example 1, except that a hydrolyzed polyvinyl acetate membrane having 88 percent of its acetyl groups removed by hydrolysis was employed in place of the 98 percent hydrolyzed polyvinyl acetate. The results obtained are plotted graphically in attached FIGURE 3.

It is evident that the 88 percent hydrolyzed polyvinyl acetate has a much inferior selectivity for the separation of water. The maximum water content in the permeated fraction when this membrane was employed was about 47 percent, as compared with a water content of 91 percent when the 98 percent hydrolyzed polyvinyl acetate membrane was used. Also, as the percent water in the feed mixture in contact with the membrane was decreased to 3.5 percent, the water content of the permeate fraction decreased to about 26 percent (whereas under the same conditions the water content of the permeate fraction was 88 percent when the 98 percent hydrolyzed polyvinyl acetate membrane was used). The reasons for these unexpected advantages obtained by using the 98 percent hydrolyzed versus the 88 percent hydrolyzed polyvinyl acetate membranes are not fully understood.

Example 3

A feed mixture consisting of 20.8 weight percent water and 79.2 weight percent dioxane was charged to the laboratory permeation apparatus. The permeation run was carried out in the identical manner as described for Example 1, except that the hydrolyzed polyvinyl acetate membrane was one which had 99+ percent of its acetyl groups removed by hydrolysis. The following weight percentages of water were contained in the permeated fraction when the following weight percentages of water remained in the feed mixture in contact with the permeation membrane:

| Percentage water in Feed | Percentage water in Permeate |
|---|---|
| 17.5 | 94.5 |
| 13.8 | 95.5 |
| 10.8 | 96.0 |
| 6.5 | 96.5 |
| 5.0 | 97.0 |

It will be noted that the selectivity remains virtually constant even though the percentage of water in the feed diminishes to 5 weight percent.

Example 4

An azeotropic ethanol-water composition containing 6 weight percent water was charged to the laboratory permeation apparatus. The permeation run was carried out in the manner and under the conditions employed in Example 1, but a 99+ percent hydrolyzed polyvinyl acetate membrane such as was used in Example 3 was also employed in this run. The following weight percentages of water were contained in the permeated fraction when the following weight percentages of water remained in feed mixture in contact with the permeation membrane:

| Percentage water in Feed | Percentage water in Permeate |
|---|---|
| 5.9 | 58.0 |
| 5.3 | 55.0 |
| 4.9 | 51.0 |

Example 5

A sec-butanol-water composition containing 16 weight percent water was charged to the laboratory permeation apparatus. The permeation run was carried out in the manner and under the conditions employed in Example 1, but a 99+ percent hydrolyzed polyvinyl acetate membrane such as was used in Example 3 was also employed in this run. The following weight percentages of water were contained in the permeated fraction when the following weight percentages of water remained in the feed mixture in contact with the permeation membrane:

| Percentage water in Feed | Percentage water in Permeate |
|---|---|
| 17.0 | 98.8 |
| 13.7 | 99.1 |
| 8.5 | 97.5 |
| 6.4 | 97.8 |
| 3.4 | 97.1 |

Example 6

A mixture of acrylonitrile and water (containing 4.1 weight percent water) was charged to the laboratory permeation apparatus. The permeation run was carried out in the manner and under the conditions employed in Example 1, but a 99+ percent hydrolyzed polyvinyl acetate membrane such as was used in Example 3 was also employed in this run. The permeation run was continued until the mixture remaining in contact with the membrane contained 2.1 weight percent water. The total amount of permeated material had an over-all composition of 79 weight percent water and 21 weight percent acrylonitrile.

Example 7

A feed mixture consisting of 80 percent by weight of pyridine and 20 percent by weight of water was charged to the laboratory permeation apparatus. A hydrolyzed polyvinyl acetate membrane having 99+ percent of its acetyl groups removed by hydrolysis was employed as the permeation membrane. The same permeation conditions as described in Example 1 were used. A permeated fraction which analyzed 80 percent by weight of water and 20 percent by weight of pyridine was collected.

Example 8

A feed mixture containing 15.1 percent water, 17.8 percent isopropanol, 33.2 percent ethanol, 24.8 percent acetone, and 9.1 weight percent methyl ethyl ketone was charged to the laboratory permeation apparatus. The permeation run was carried out under the conditions described in Example 1 while employing the same membrane as was used in Example 1, i.e. a 98 percent hydrolyzed polyvinyl acetate membrane. The permeation run was continued until the water content of the feed mixture remaining in contact with the membrane in the feed chamber of the permeation apparatus was reduced to 12.8 weight percent water. The total permeate collected up to that time was then analyzed and found to contain 89.5 weight percent water.

While the present invention has been described in relation to certain specific examples and embodiments, it is obvious that many other diverse organic chemical mixtures which contain water may be suitable feeds to the process of this invention. While it is essential to employ the hydrolyzed polyvinyl acetate membranes which have at least 98 percent of their acetyl groups removed by hydrolysis, it is also possible to employ for the permeation of water-organic chemical mixtures a hydrolyzed polyvinyl acetate membrane which has been hydrolyzed to a lesser extent and to effect hydrolysis to the 98 percent or higher level in situ during the permeation run which is carried out for a period of time. Similarly it is also possible to effect in situ curing of the membrane during its use in the permeation run, especially at temperatures of 100–150° C. or higher. Complex mixtures of water with water soluble organic chemicals such as are produced by the synthol process can be processed for the removal of water therefrom. These synthol products may contain water together with as many as 10 or more organic chemicals. The customary methods for removing water from the synthol water-soluble chemicals are highly complex.

Thus having described the invention what is claimed is:

1. In a process for removing water from a feed water-organic chemical mixture wherein the feed mixture is contacted with one side of a permeation membrane under permeation conditions and a permeated fraction having a higher concentration of water than is contained in the feed mixture is removed from the opposite side of said permeation membrane, the improvement which comprises employing as the membrane a hydrolyzed polyvinyl acetate membrane which maintains a high selectivity for water under permeation conditions irrespective of the water content of the feed, which hydrolyzed polyvinyl acetate has at least 98 percent of its acetyl groups removed by hydrolysis.

2. The process of claim 1 wherein the hydrolyzed polyvinyl acetate membrane employed is one which has been heat-cured at a temperature of at least about 100° C.

3. The process of claim 2 in which said heat-curing is carried out in the substantial absence of oxygen.

4. A process for reducing the concentration of water in a feed water-organic chemical mixture which comprises introducing said feed mixture into the feed chamber of a permeation apparatus, said permeation apparatus being comprised of a feed chamber sealed from a permeate zone by a hydrolyzed polyvinyl acetate permeation membrane which maintains a high selectivity for water under permeation conditions irrespective of the water content of the feed, said hydrolyzed polyvinyl acetate membrane having at least 98 percent of its acetyl groups removed by hydrolysis, maintaining the mixture in the feed chamber in the liquid phase, contacting the liquid phase mixture in the feed zone with the permeation membrane, permeating a portion of the liquid mixture into and through said membrane and vaporizing the permeated fraction from the opposite side of the membrane into the permeate zone, withdrawing the permeated fraction which has a higher concentration of water than is contained in the feed mixture from the permeate zone, and withdrawing a non-permeated fraction having a lower concentration of water than is contained in the feed mixture from the feed chamber.

5. The process of claim 4 in which the feed mixture is a water soluble organic chemical-water solution containing less than about 25 percent water and in which the permeation operation temperature is between about 100° and 170° C.

6. The process of claim 5 in which the feed mixture is an aqueous solution of ethanol and isopropanol.

7. The process of claim 5 in which the feed mixture is an aqueous solution of dioxane.

8. The process of claim 5 in which the feed mixture is an aqueous solution of pyridine.

9. The process of claim 5 in which the feed mixture is an aqueous solution of sec-butanol.

10. The process of claim 5 in which the feed mixture is an aqueous solution of acrylonitrile.

11. The method of removing water which is present in a minor amount in an organic liquid, which method comprises contacting said liquid with one side of a hydrolyzed polyvinyl acetate membrane which maintains a high selectivity for water under permeation conditions irrespective of the water content of said liquid, which hydrolyzed polyvinyl acetate has about 98 to 99 percent of its acetyl groups removed by hydrolysis whereby the membrane becomes wet with aqueous liquid and removing vapors of aqueous liquid from the other side of the membrane.

12. The method of claim 11 wherein the amount of water in the organic liquid is less than 25 percent.

13. The method of claim 11 which includes the step of heating said membrane to a temperature in the range of about 100° C. to 150° C. for at least about an hour before said membrane is contacted with said water-containing organic liquid.

14. The method of claim 13 wherein said heating is carried out in the substantial absence of atmospheric oxygen.

References Cited in the file of this patent

UNITED STATES PATENTS

| | | |
|---|---|---|
| 2,232,153 | Vohrer | Feb. 18, 1941 |
| 2,386,826 | Wallach et al. | Oct. 16, 1945 |

OTHER REFERENCES

Modern Plastics, vol. 27, No. 10, June 1950, pages 97, 98, 100, 102, 150–52, 154, 156, 158.

"Elvanol," E. I. du Pont de Nemours & Co., 1953, pages 5, 17–19, 37, 39.

Science, July 13, 1956, vol. 124, No. 3211, pages 77–79.